United States Patent
Iyoda et al.

(10) Patent No.: US 7,213,670 B2
(45) Date of Patent: May 8, 2007

(54) ROLLOVER DETERMINATION SYSTEM AND METHOD

(75) Inventors: Motomi Iyoda, Seto (JP); Tomoki Nagao, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 429 days.

(21) Appl. No.: 10/483,967

(22) PCT Filed: Jul. 23, 2002

(86) PCT No.: PCT/IB02/02873

§ 371 (c)(1),
(2), (4) Date: Jan. 16, 2004

(87) PCT Pub. No.: WO03/010034

PCT Pub. Date: Feb. 6, 2003

(65) Prior Publication Data

US 2005/0257981 A1 Nov. 24, 2005

(30) Foreign Application Priority Data

Jul. 24, 2001 (JP) .............................. 2001-223238

(51) Int. Cl.
*B60K 28/14* (2006.01)
(52) U.S. Cl. ..................................... 180/282; 701/45
(58) Field of Classification Search ............... 180/282; 280/735; 340/440; 701/45, 301
See application file for complete search history.

(56) References Cited

U.S. PATENT DOCUMENTS

| | | | | |
|---|---|---|---|---|
| 6,002,975 A * | 12/1999 | Schiffmann et al. | ........... | 701/36 |
| 6,100,797 A * | 8/2000 | Mattes et al. | ................ | 340/437 |
| 6,141,604 A * | 10/2000 | Mattes et al. | ................... | 701/1 |
| 6,282,474 B1 * | 8/2001 | Chou et al. | .................... | 701/45 |
| 6,301,536 B1 * | 10/2001 | Vaessen et al. | ............... | 701/45 |
| 6,315,074 B1 * | 11/2001 | Achhammer et al. | ........ | 180/282 |
| 6,424,897 B1 * | 7/2002 | Mattes et al. | .................. | 701/45 |
| 6,529,811 B2 * | 3/2003 | Watson et al. | ................ | 701/45 |
| 6,535,800 B2 * | 3/2003 | Wallner | ......................... | 701/1 |
| 6,542,073 B2 * | 4/2003 | Yeh et al. | .................... | 340/440 |
| 6,560,519 B2 * | 5/2003 | Williams et al. | .............. | 701/45 |

(Continued)

FOREIGN PATENT DOCUMENTS

DE 197 44 083 A1 4/1999

(Continued)

OTHER PUBLICATIONS

International Search Report dated Jul. 11, 2002 and Notice of Acceptance dated Jun. 21, 2005.

*Primary Examiner*—Faye M. Fleming
*Assistant Examiner*—Laura B. Freedman
(74) *Attorney, Agent, or Firm*—Kenyon & Kenyon LLP

(57) ABSTRACT

A rollover determination system 20 includes a first roll rate sensor 22, a lateral G-sensor 26, and a main rollover determination unit 30. The first roll rate sensor 22 detects roll rate of a vehicle. The lateral G-sensor 26 detects acceleration in the lateral direction of the vehicle. The main rollover determination unit 30 determines a possibility of rollover of the vehicle based on roll rate RR and lateral acceleration Gy. A safing determination unit 70 for confirming an occurrence of rollover is additionally incorporated in the main rollover determination unit 30.

12 Claims, 7 Drawing Sheets

U.S. PATENT DOCUMENTS

2002/0139599 A1* 10/2002 Lu et al. .................... 180/282

FOREIGN PATENT DOCUMENTS

| EP | 1 157 898 A1 | 11/2001 |
| EP | 1 219 501 A2 | 7/2002 |
| JP | 9 240 399 | 9/1997 |
| JP | 10-309 920 | 11/1998 |
| JP | 11-83534 | 3/1999 |
| JP | 2000-9599 | 1/2000 |
| JP | 2000-127891 | 5/2000 |
| WO | WO 99/47384 | 9/1999 |

* cited by examiner

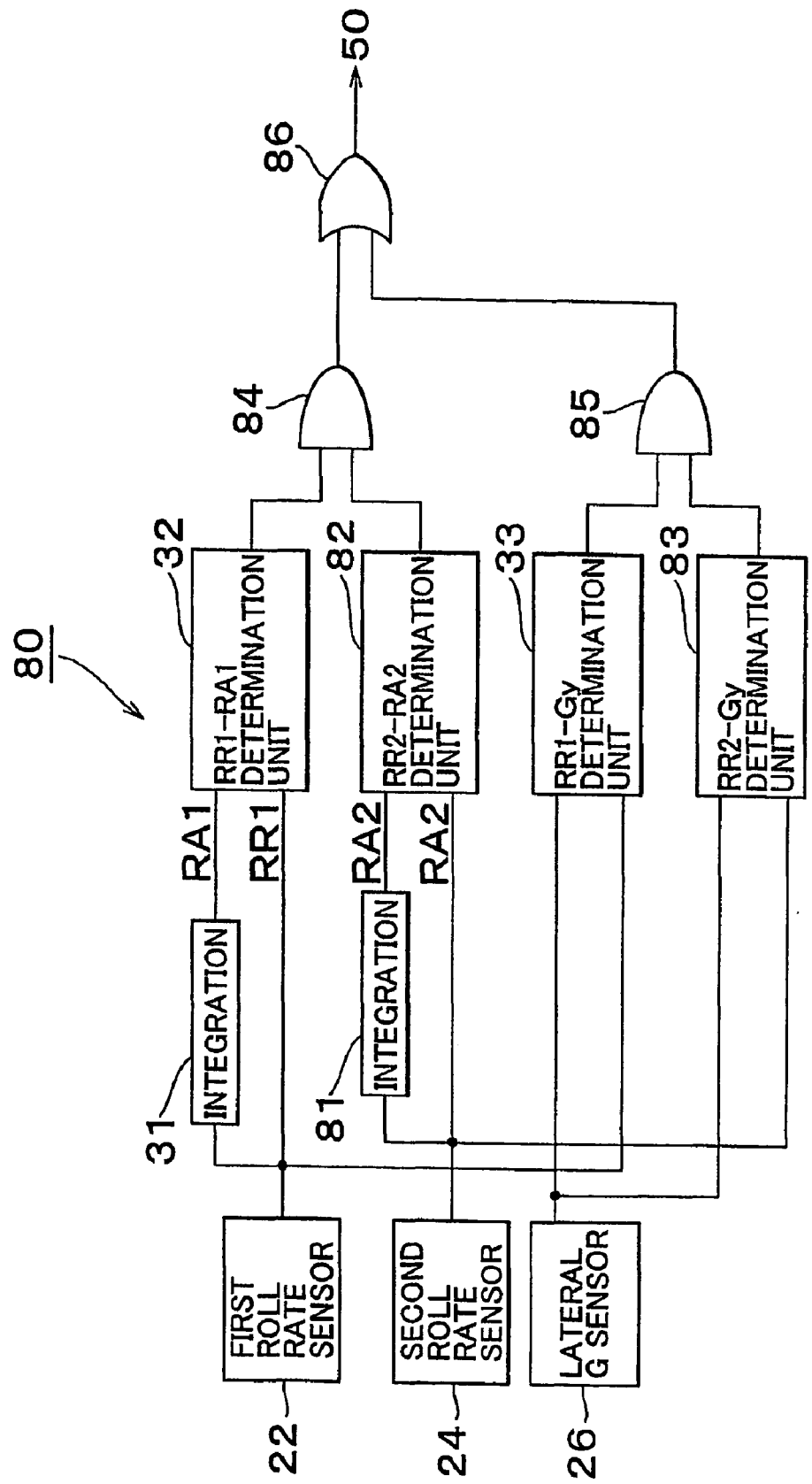

ROLLOVER DETERMINATION SYSTEM AND METHOD

This is a 371 of PCT/IB02/02873 filed 23 Jul. 2002, which claims priority to JP 2001-223238 filed 24 Jul. 2001, the contents of which are incorporated herein by reference.

BACKGROUND OF THE INVENTION

1. Field of Invention

The invention relates to a rollover determination system for determining a possibility of a rollover of a vehicle. The rollover determination system is mounted on a vehicle as a preprocessing system of an occupant protection device such as a side airbag and is adapted to activate the occupant protection device immediately and appropriately in the event of the vehicle rollover.

2. Description of Related Art

A rollover determination system for determining a rollover of a vehicle is disclosed in Japanese Laid-open Patent Publication No. 2000-9599. In this system, it is determined whether the vehicle is in a rollover state at an earlier stage on the basis of not only a rotational angular velocity in the longitudinal direction of the vehicle, but also a roll rate that represents a lateral acceleration of the vehicle.

The aforementioned rollover determination system uses the lateral acceleration as well as the rotational angular velocity for the detection of a rollover of the vehicle. This makes it possible to activate an occupant protection device so as to protect the occupant of the vehicle in the event of the rollover.

Upon collision of the vehicle at its front portion (front-end collision), an air bag for the front-end collision is deployed based on a detected value of an acceleration sensor (a G-sensor) disposed in the vehicle. The acceleration sensor detects longitudinal acceleration of the vehicle.

Recently, a safing function has been added to the determination system for the deployment of the airbag for the front-end collision so as to prevent the airbag or the like from being activated by mistake. Assuming that deployment of the airbag is determined on the basis of a signal sent from a single G sensor, the airbag may be deployed in accordance with a wrong determination made on the basis of the error signal of the G sensor owing to noise, or failure of the G sensor. The safing function is added to the collision determination system in order to prevent undesired activation of the occupant protecting device in accordance with the wrong determination.

For achieving the above-described safing function, for example, regarding front-end collisions, a mechanical safing sensor is provided at a central portion of a vehicle in addition to the G sensor provided in a front portion of the vehicle so that the front-end collision is detected using values sent from a plurality of sensors.

The aforementioned safing function is applicable to a side collision of the vehicle. Detected values of a plurality of lateral acceleration sensors (G sensors) mounted in different portions of the vehicle are combined, based on which the side collision of the vehicle can be accurately detected.

In the event the vehicle is rolled over, the occupant is hit against the side of a passenger compartment. Accordingly the occupant protection device, for example, the side airbag, curtain shield airbag, seat belt pretensioning device and the like is activated. Like the front-collision, it is undesirable that the occupant protection device for the rollover is activated faultily.

It is preferable that the safing function be operated during determination of the vehicle rollover as in the case of the front-end collision. Any satisfactory proposal, however, has not been made yet with respect to the aforementioned function. There has been proposed to prevent faulty activation of the occupant protection device for the front-collision or the side-collision by operating the safing function. The technology for operating the safing function for preventing faulty activation of the occupant protection device has not been considered to a satisfactory level.

Furthermore it is preferable that determination of the vehicle rollover be made 20 on the basis of the lateral acceleration as well as the roll rate. However, any proposal with respect to the safing sensor used for determining the vehicle rollover has not been made yet. The mechanical sensor may be used as the safing sensor used for detecting the rollover as in the case of the front-collision. The mechanical sensor that is capable of accurately determining the vehicle rollover has not been introduced yet. Use of the safing sensor with a response lag may delay the determination of the vehicle rollover.

Meanwhile, the safing sensor with excessively high sensitivity may be brought into ON state frequently even when the vehicle is in a normal running state, failing to perform the intended safing operation.

SUMMARY OF THE INVENTION

It is therefore an object of the invention to provide a rollover determination system which incorporates a safing function and is capable of accurately determining a possibility of the vehicle rollover.

A rollover determination system includes a first roll rate sensor that detects a first roll rate of a vehicle, a lateral acceleration sensor that detects a lateral acceleration of the vehicle in a lateral direction of the vehicle, and a controller that determines whether there is a possibility of rollover of the vehicle on the basis of the first roll rate detected by the first roll rate sensor and the lateral acceleration detected by the lateral acceleration sensor, wherein the controller makes a determination that confirms the possibility of rollover of the vehicle.

According to the embodiment of the invention, the safing function is added to the rollover determination system which allows determination of the vehicle rollover by eliminating faulty determination.

The rollover determination system further includes a second roll rate sensor that detects a second roll rate of the vehicle such that a determination is made whether there is a possibility of rollover of the vehicle on the basis of the first roll rate, second roll rate, and the lateral acceleration.

According to another embodiment of the invention, the rollover determination system is provided by changing the structure of the system, that is, adding another roll rate sensor.

The controller may be designed to perform both the vehicle rollover determination and the safing determination.

The determination is made whether there is a possibility of rollover of the vehicle in accordance with at least one map indicating a relationship between two parameters selected from the roll rate, a roll angle obtained by integrating the roll rate with respect to time, and the lateral acceleration.

According to the embodiment of the invention, the safing determination is made in the same way as in the determination of the vehicle rollover. The resultant rollover determination system, thus, can be simplified. The safing determination does not necessarily require the map for performing the safing determination. For example, the safing determination may be performed by determining whether the roll rate exceeds a predetermined threshold value within a predetermined time period elapsing from detection of the roll rate.

The rollover determination system may incorporate the safing function rather than adding the safing function to the rollover determination system.

A rollover determination system includes a first roll rate sensor that detects a first roll rate of a vehicle, a second roll rate sensor that detects a second roll rate of the vehicle, a lateral acceleration detector that detects a lateral acceleration in a lateral direction of the vehicle. In the rollover determination system, a first determination is made whether there is a possibility of rollover of the vehicle on the basis of the first roll rate detected by the first roll rate sensor and the second roll rate detected by the second roll rate sensor. In the rollover determination system, a second determination is made whether there is a possibility of rollover of the vehicle on the basis of the lateral acceleration detected by the lateral acceleration detector and the first and second roll rate detected by the first and the second roll rate sensors, respectively. The first and the second determinations are made in parallel.

According to another embodiment of the invention, a first rollover determination is performed for determining the rollover on the basis of the roll rate in parallel with a second rollover determination for determining the rollover of the vehicle on the basis of the lateral acceleration and the roll rate. This structure corresponds to the rollover determination system that incorporates the safing function. This makes it possible to perform the rollover determination while suppressing faulty determination.

BRIEF DESCRIPTION OF THE DRAWINGS

FIG. 7 is a block diagram showing the functional structure of a rollover determination system according to a second embodiment of the invention.

DETAILED DESCRIPTION OF PREFERRED EMBODIMENTS

Hereinafter, embodiments of the invention will be described with reference to the attached drawings. The expression "determination of rollover" used herein represents that it is determined whether there is a possibility that rollover of the vehicle takes place.

(First Embodiment)

Figure 1:
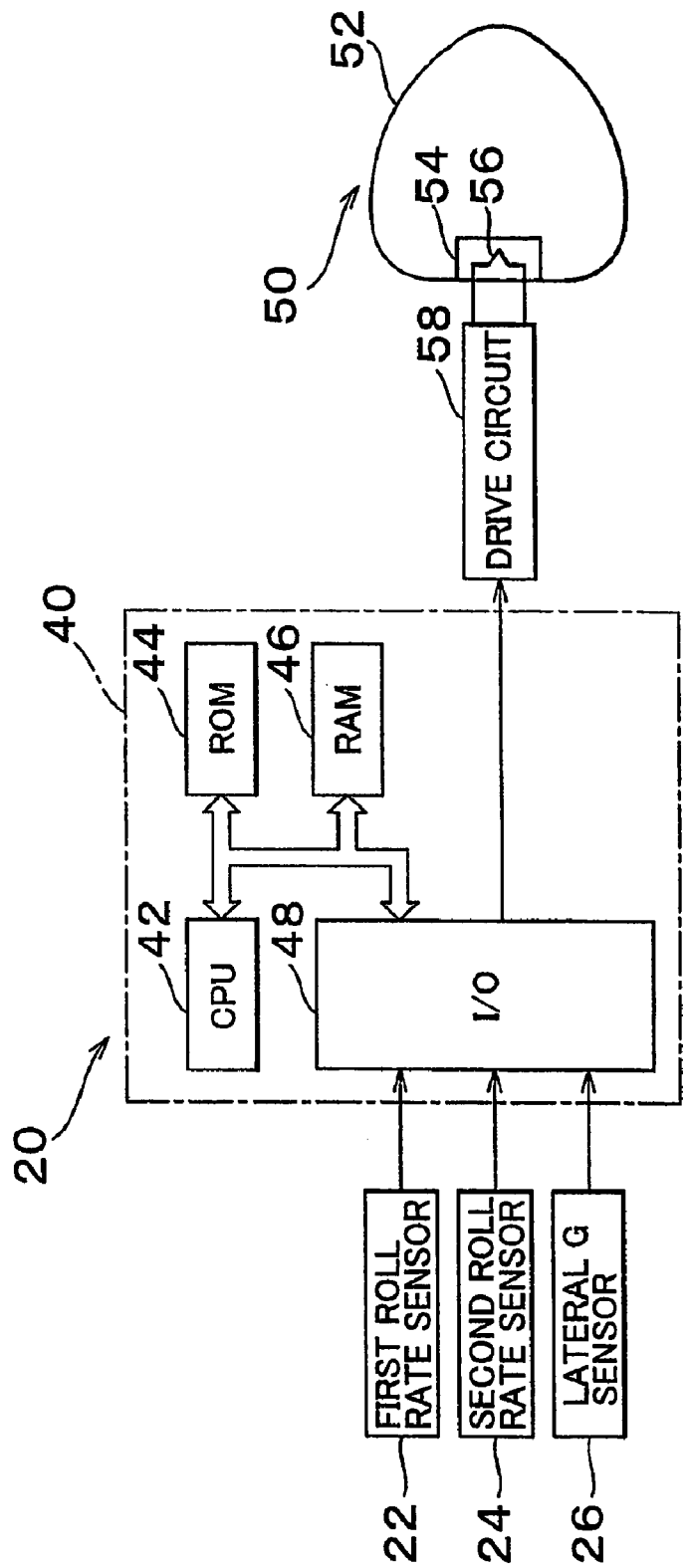
FIG. 1 is a view showing the hardware configuration of a rollover determination system according to a first embodiment of the invention.
Figure 3:
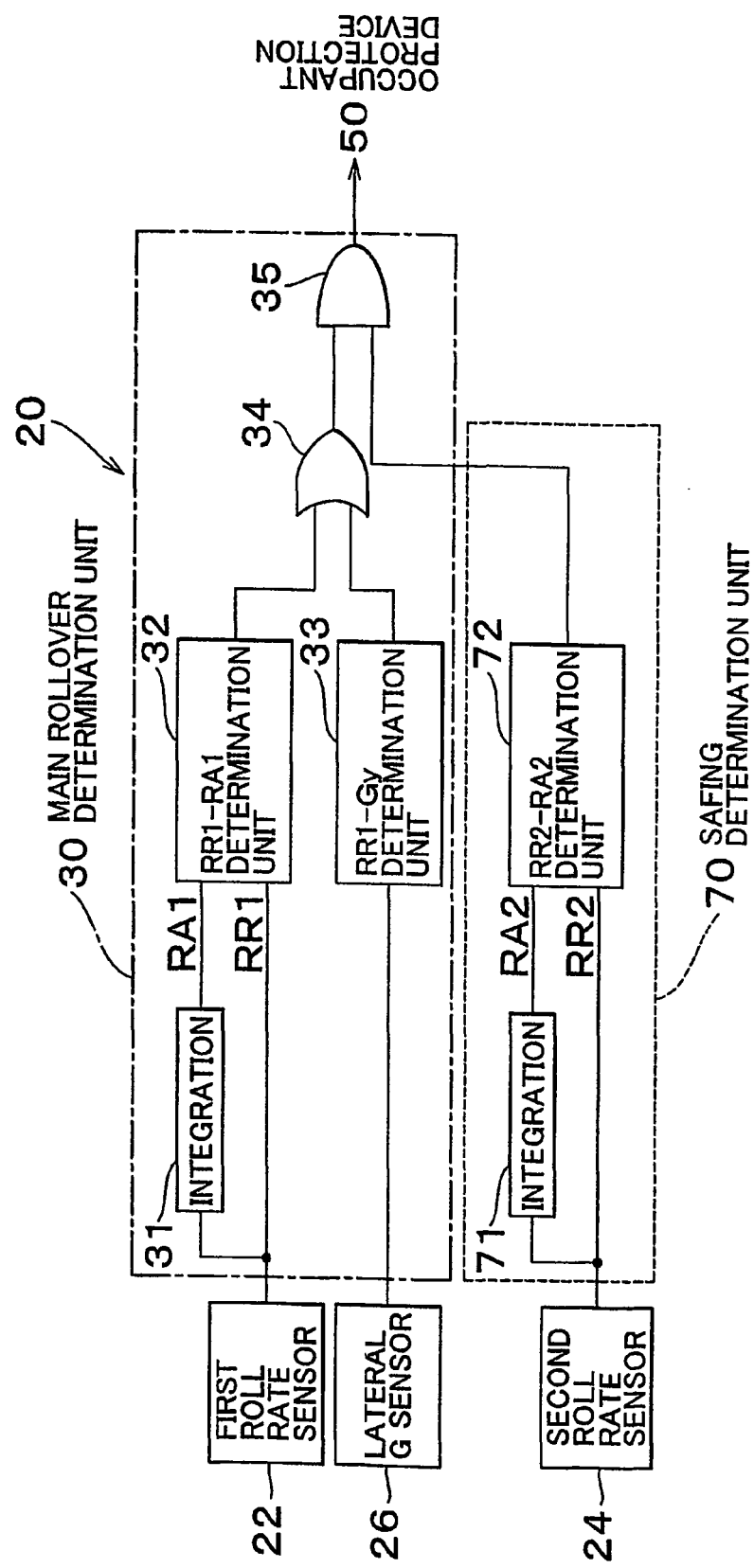
FIG. 3 is a block diagram showing the functional structure of the rollover determination system shown in FIG. 1.

FIG. 1 shows a structure of a rollover determination system 20 according to a first embodiment. Referring to FIG. 1, a side airbag device 50 is shown as the occupant protection device that is activated on the basis of a result of the rollover determination system 20 incorporated therein. FIG. 3 is a block diagram illustrating the structure of the rollover determination system 20.

Figure 2:
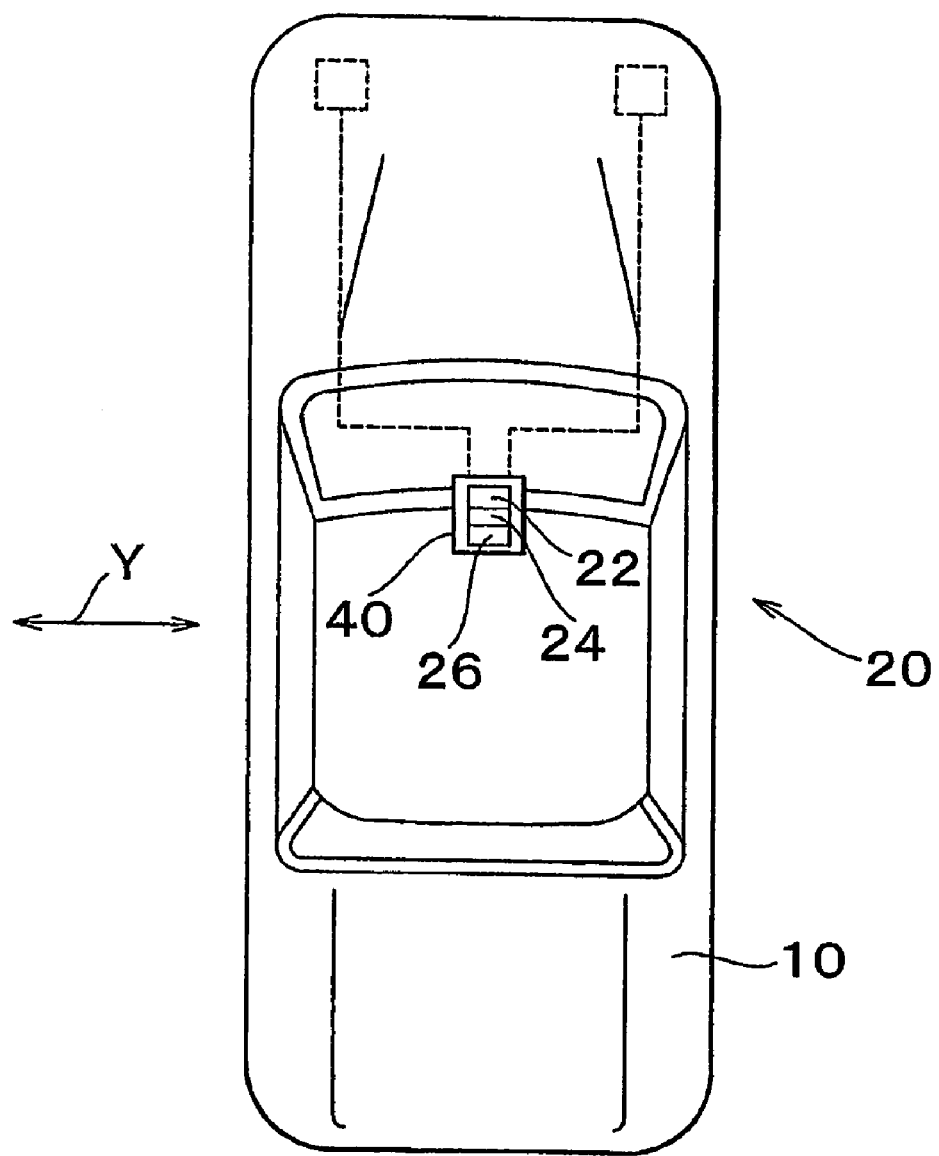
FIG. 2 is a view showing a vehicle in which the rollover determination system shown in FIG. 1 is incorporated.

Referring to FIGS. 1 and 2, the rollover determination system 20 of this embodiment includes a first roll rate sensor 22 for detecting a rollover of the vehicle 10, a second roll rate sensor 24, and a lateral G-sensor 26 as lateral acceleration detector. The sensors 22, 24, and 26 are collectively disposed in a floor tunnel in a central portion of the vehicle 10 as shown in FIG. 2.

The second roll rate sensor 24 is provided as a part of the safing mechanism as described later. The same sensor as the first roll rate sensor 22 may be used as the second roll rate sensor 24. The first-roll rate sensor 22 and the second roll rate sensor 24 are adapted to detect a rotational angular velocity (roll rate) which causes the vehicle 10 to be rolled over. Here, a known type of sensor which detects a rotational angular velocity utilizing Corioli's force may be used as the first and the second roll rate sensors 22, 24. Each of those roll rate sensors 22, 24 generates a voltage in accordance with the roll rate, and outputs the average value of the thus generated voltages as the roll rate RR. Alternatively an acceleration sensor, a gas gyro or the like, which is capable of detecting the force acting on a certain mass in accordance with rotation about a longitudinal axis of the vehicle 10 may be used as the roll rate sensors 22, 24.

The lateral G-sensor 26 detects a lateral acceleration Gy which acts in the lateral direction of the vehicle 10 as represented by an arrow Y in FIG. 2. Various known types of acceleration sensors, for example, an electronic or a mechanical sensor which generates the voltage in accordance with the lateral acceleration Gy may be used as the lateral G-sensor 26.

The rollover determination system 20 further includes an ECU (electronic control unit) 40. The ECU 40 determines rollover of the vehicle based on the roll rate RR detected by the respective roll rate sensors 22, 24 and the lateral acceleration Gy detected by the lateral G-sensor 26. As shown in FIG. 2, the ECU 40 is disposed in the floor tunnel and receives output signals from the above-described sensors 22, 24, and 26. The ECU 40 includes a CPU 42 as its main component, a ROM 44 storing a predetermined operation program, a RAM 46 for temporarily storing data, and an input/output circuit (I/O) 48.

The CPU 42 is arranged to start sampling at predetermined intervals when the first roll rate sensor 22 detects a first roll rate RR1 that is equal to or greater than a predetermined value. Then, the CPU 42 first determines rollover of the vehicle 10 based on the roll rate RR1 detected by the first roll rate sensor 22 and the lateral acceleration Gy detected by the lateral G-sensor 26.

During the determination of the vehicle rollover, the CPU 42 also performs a safing determination with respect to the rollover of the vehicle based on the roll rate RR2 detected by the second roll rate sensor 24. That is, the conventional rollover determination is performed using the first roll rate RR1 detected by the first roll rate sensor 22 and the lateral acceleration Cy detected by the lateral G-sensor 26 in parallel with safing determination. As a result, the CPU 42 determines the possibility of the vehicle rollover on the basis of not only the result of the conventional rollover determination but also the result of the safing determination using the second roll rate RR2 detected by the second roll rate sensor 24.

As it is apparent from the foregoing description, the CPU 42 suppresses faulty determination of the vehicle rollover using the second roll rate RR2 detected by the second roll rate sensor 24 for the safing operation.

The functional structure of the CPU 42 will be apparent from the block diagram showing the rollover determination system 20 in FIG. 3. Detail of the rollover determination by the CPU 42 will hereinafter be described with reference to FIG. 3.

As shown in FIG. 3, the CPU 42 includes a main rollover determination unit 30 and a safing determination unit 70. The main rollover determination unit 30 includes an integral operation unit 31, an RR1-RA1 determination unit 32, and an RR1-Gy determination unit 33. The integral operation unit 31 is adapted to calculate a roll angle RA1 by integrating the first roll rate RR1 with respect to time. The RR1-RA1 determination unit 32 is adapted to perform the rollover determination using the first roll rate RR1 and the calculated roll angle RA1. The RR1-Gy determination unit 33 is adapted to perform the rollover determination using the first roll rate RR1 and the lateral acceleration Gy. The main rollover determination unit 30 further includes an OR circuit 34 and an AND circuit 35. The OR circuit 34 generates a first determination signal when at least one of the RR1-RA1 determination unit 32 and the RR1-Gy determination unit 33 determines the possibility of the rollover of the vehicle 10. The AND circuit 35 generates a second determination signal by adding the result of the determination by the safing determination unit 70 to that of the first rollover determination.

The safing determination unit 70 has the construction corresponding to the integral operation unit 31 and the RR1-RA1 determination unit 32 using the first roll rate RR1. That is, the safing determination unit 70 has an integral operation unit 71 and an RR2-RA2 determination unit 72. The integral operation unit 71 is adapted to calculate a roll angle RA2 by integrating a second roll rate RR2 with respect to time. The RR2-RA2 determination unit 72 performs the rollover determination using the second roll rate RR2 and the roll angle RA2 as a time component of the second roll rate RR2.

The above structured main rollover determination unit 30 performs the first rollover determination using the first roll rate RR1 detected by the first roll rate sensor 22 and the lateral acceleration Gy detected by the lateral G-sensor 26. Here, the first rollover determination is performed by the main rollover determination unit 30 in the same manner as used in the conventional art on the basis of the roll rate and lateral acceleration.

Figure 4A:
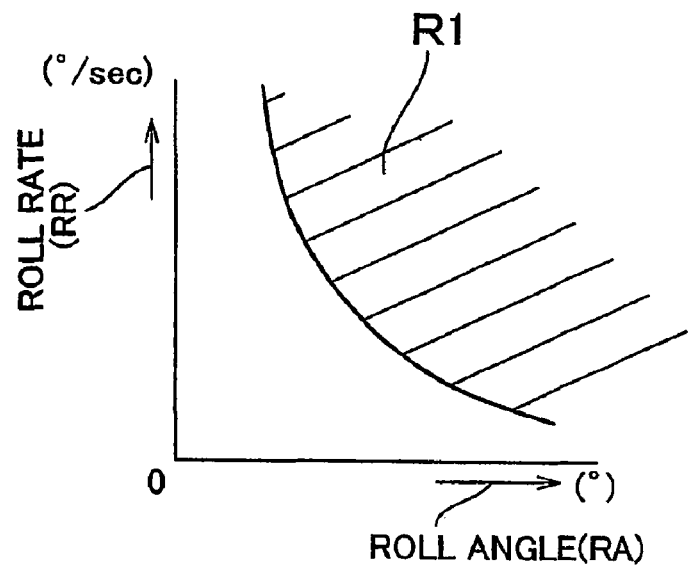
FIG. 4A is a determination map consisting of roll rate and roll angle.
Figure 4B:
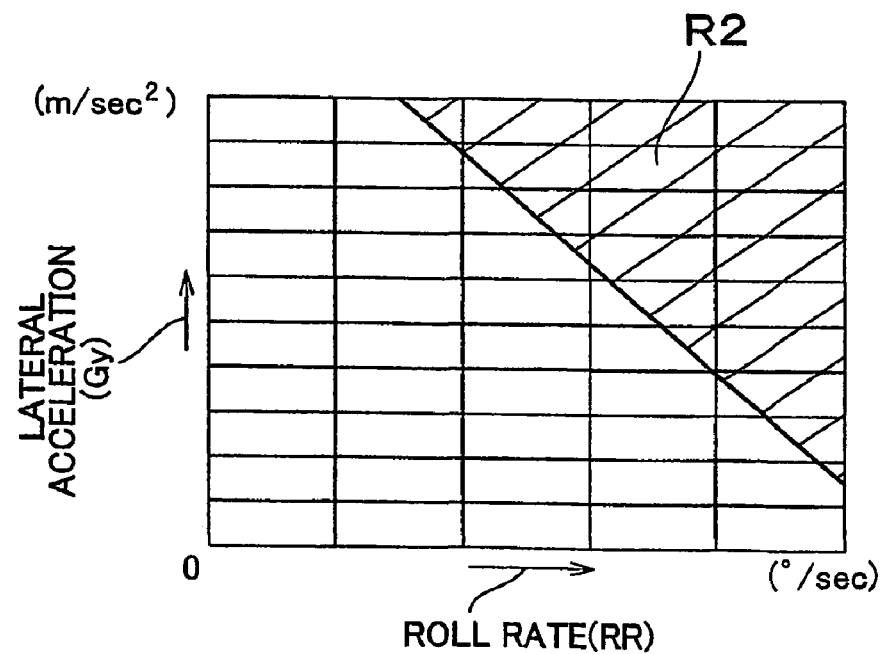
FIG. 4B shows a determination map consisting of lateral acceleration Gy and roll rate RR1.

The RR1-RA1 determination unit 32 performs determination of rollover based on the first roll rate RR1 and the roll angle RA1 obtained by integrating the first roll rate RR1 with respect to time. The RR1-RA1 determination unit 32 performs determination using a map indicating a relationship between roll rate and roll angle as shown in FIG. 4A where a region R1 is set in advance. When a point defined by the first roll rate RR1 periodically detected by the first roll rate sensor 22 and the roll angle RA1 obtained by integrating the first roll rate RR1 with respect to time is within the region R1, it is determined that the vehicle 10 has been rolled over.

The map shown in FIG. 4A is stored in the ROM 44 of the ECU 40. It is preferable that the region R1 be set for each vehicle model on the basis of data obtained from rollover tests, virtual simulation tests and the like of the vehicle.

The RR1-Gy determination unit 33 performs determination of rollover based on the first roll rate RR1 and the lateral acceleration Gy. The RR1-Gy determination unit 33 performs determination using a map indicating a relationship between roll rate RR1 and lateral acceleration Gy as shown in FIG. 4A where a region R2 is set in advance. When a point defined by the first roll rate RR1 and the lateral acceleration Gy is within the region R1, it is determined that the vehicle 10 has been rolled over.

The map used by the RR1-Gy determination unit 33 is also stored in the ROM 44 of the ECU 40. It is preferable to set the region R2 for each vehicle model on the basis of data obtained from rollover tests, virtual simulation tests and the like, of the vehicle.

When at least one of the RR1-RA1 determination unit 32 and the RR1-Gy determination unit 33 of the main rollover determination unit 30 determines the rollover of the vehicle 10, a signal indicative of such a result of the determination is sent to the AND circuit 35 via the OR circuit 34.

As described above, the rollover determination system 20 of the embodiment performs the first rollover determination using the first roll rate RR1 detected by the first roll rate sensor 22 and the lateral acceleration Gy detected by the lateral G-sensor 26 in the same manner as conventional systems.

However, the rollover determination system 20 of the embodiment further includes the safing determination unit 70 and thus incorporates an additional function of performing the rollover determination as safing operation using the second roll rate RR2 detected by the second roll rate sensor 24.

As described above, any satisfactory proposal has not been made for safing operation for the vehicle rollover. Accordingly no suitable sensor has been available at present. It has been made clear that it is preferable to use the roll rate sensor, which has been used for rollover determination of vehicles, as a sensor for the safing operation.

Figure 5A:
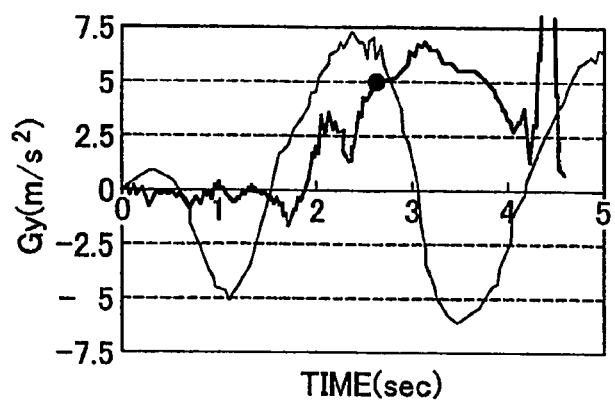
FIG. 5 is a graph of detected data which changes with time for normal driving and rollover of a vehicle, wherein FIG. 5A indicates the lateral acceleration Gy, FIG. 5B indicates a vertical acceleration Gz, and FIG. 5C indicates the roll rate RR.
Figure 5B:
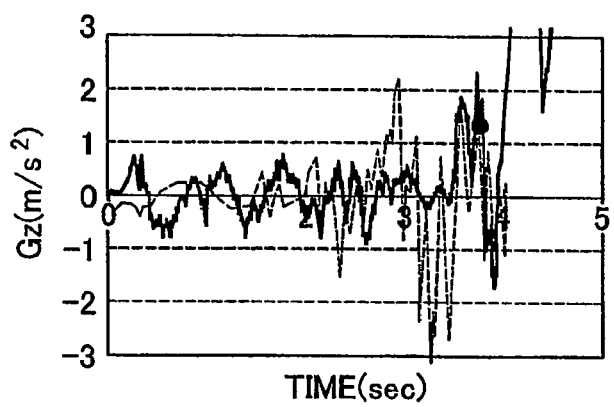
Figure 5C:
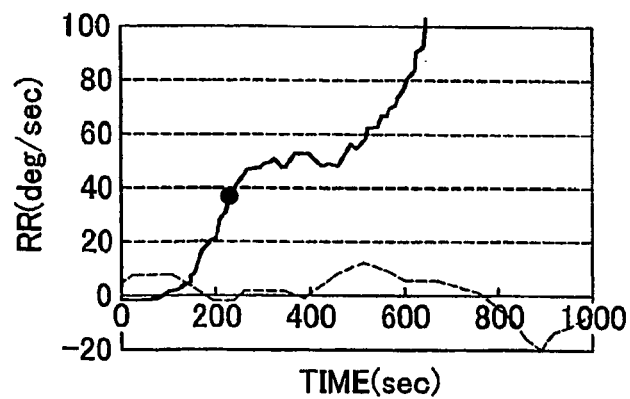

In view of the foregoing aspect, FIGS. 5A to 5C shows data detected when the vehicle is normally travelling and the vehicle is rolled over with elapse of time. FIG. 5A shows a relationship between the lateral acceleration Gy and time. FIG. 5B shows a relationship between the longitudinal acceleration Gz and time. FIG. 5C shows a relationship between the roll rate RR and time. Each filled circle in the graphs of Figs. Figs. A to C represents a limit of time (time required for response) at which a final determination is made whether activation of the occupant protection device is required. That is, the rollover determination has to be made before the limit of time.

Referring to FIGS. 5A and 5B, however, it is difficult to clearly determine whether the vehicle is normally travelling or the vehicle is about to rollover even at the point of the limit time. On the contrary, referring to FIG. 5C, values of the roll rate RR of the vehicle can be clearly discriminated from those of the vehicle in a normal travelling state until the time reaches the limit value. Accordingly the roll rate sensor is considered to be effective as being the safing sensor.

Namely, in the rollover determination system of the embodiment, a roll rate sensor as has been generally used for rollover determination is added as a safing sensor. Then the roll rate detected by the added roll rate sensor is used for the safing determination. The foregoing drawback of the conventional system, thus, may be dissolved by simply providing a part of the conventional rollover determination system so as to add the safing mechanism.

Referring back to FIG. 3, the safing determination performed in the safing determination unit 70 of the CPU 42 will be described. As described above, the safing determination unit 70 includes a similar structure to that of the RR1-RA1 determination unit 32 within, the main rollover determination unit 30.

The safing determination unit. 70 determines rollover of the vehicle 10 based on the second roll rate RR2 and the roll angle RA2 which is obtained by integrating the second roll rate RR2 with respect to time in the integral operation unit 71. Here, the determination by the RR2-RA2 determination unit 72 may be performed in the same manner as the RR1-RA1 determination unit 32, using the map consisting of roll rate and roll angle as shown in FIG. 4A. That is, the map shown in FIG. 4A can be used as a map based on which rollover of the vehicle 10 is determined as the safing operation.

The determination signal generated from the RR2-RA2 determination unit 72 is sent to the AND circuit 35 of the main rollover determination unit 30. Then the CPU 42 finally determines rollover of the vehicle 10 using the determination signals sent from the OR circuit 34 and the safing determination unit 70, respectively. If rollover of the vehicle 10 is determined, the CPU 42 sends a final determination signal to the occupant protection device.

As described above, the side airbag system 50 is shown in FIG. 1 as an example of the occupant protection device. Hereinafter, the structure of the side airbag system 50 associated with the rollover determination will be briefly described. The side airbag system 50 includes a side airbag 52, an inflator 54 which supplies the side airbag 52 with gas, an ignition device 56 for firing gas generating agent (not shown), and a drive circuit 58. When the determination signal indicative of rollover of the vehicle 10 is sent to the side airbag system 50 from the CPU 42, the drive circuit 58 receives the signal as an activation signal and then applies electric current to the ignition device 56 to be ignited. The side airbag 52, thus, is deployed.

Figure 6:
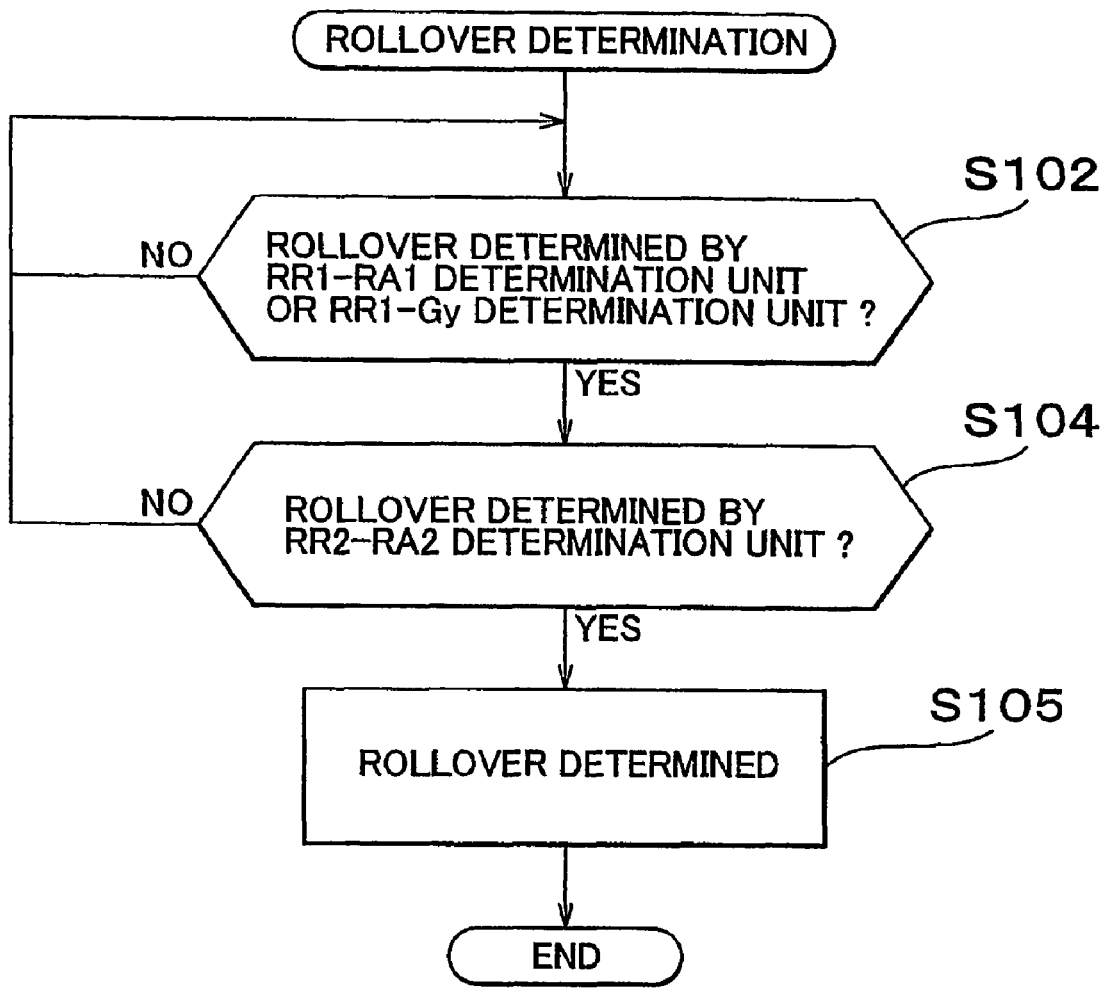
FIG. 6 is a flowchart showing a routine that a CPU of the rollover 30 determination system shown in FIG. 1 executes in the rollover determination.

FIG. 6 is a flowchart illustrating a control routine executed by the CPU 42 during determination of the vehicle rollover. The routine shown in FIG. 6 starts, for example, after the first roll rate RR1 detected by the first roll rate sensor 22 exceeds a predetermined value.

It is confirmed in step S102 whether at least one of the RR1-RA1 determination unit 32 and the RR1-Gy determination unit 33 has determined rollover of the vehicle 10. If YES is obtained, that is, the possibility of the vehicle rollover is confirmed in accordance with the determination of at lease one of the determination units 32 and 33 in step S102, the process proceeds to step S104.

In step S104, safing operation is performed. The second roll rate sensor 24 detects the second roll rate RR2 in parallel with the operation of the first roll rate sensor 22. Therefore, the RR2-RA2 determination unit 72 also determines the possibility of the vehicle rollover in step S104.

The final determination of the vehicle rollover is performed in step S104. Only when the vehicle rollover is determined in the safing operation (YES in step S104), the process proceeds to step S105 where the vehicle rollover is determined. The control routine, thus, ends.

Meanwhile, when the vehicle rollover is not determined in step S104, the process returns to step S102 for repeating execution of the routine.

In the first embodiment, the rollover determination system 20 is provided with the second roll rate sensor 24 as a safing sensor that detects the roll rate, based on which the vehicle rollover is determined. As the roll rate is an effective parameter that reflects the rollover state of the vehicle compared with the lateral acceleration Gy and the longitudinal acceleration Gz of the vehicle, resulting in effective safing function.

Further, the structure of the rollover determination system 20 may be realized by simply adding the second roll rate sensor 24 and the associated RR2-RA2 determination unit 72 to the conventional rollover determination system.

Accordingly, the rollover determination system 20 of the embodiment allows accurate determination with respect to the possibility of rollover of the vehicle on the basis of two different roll rates even when the values detected by the lateral G sensor 26 has a certain abnormality, for example.

Second Embodiment

Next, a rollover determination system according to a second embodiment of the invention will be described. FIG. 7 is a block diagram showing the functional structure of a rollover determination system 80 according to the second embodiment of the invention. The structure of the rollover determination system 80 of the second embodiment is the same as that of the rollover determination system 20 of the first embodiment shown in FIG. 1. The description of the same elements or the same operation will be omitted and only the characteristic points of the second embodiment will be described referring to FIG. 8 corresponding to FIG. 3 as explained in the first embodiment. The same elements as those shown in FIG. 3 will be denoted by the same reference numerals, and the description of those elements, thus, will be omitted.

As shown in FIG. 7, the rollover determination system 80 is provided with two determination units each corresponding to the main rollover determination unit 30 in parallel with each other.

Referring to FIG. 7, an RR2-RA2 determination unit 82 is added to the RR1-RA1 determination unit 32 in parallel with each other, and an RR2-Gy determination unit 83 is added to the RR1-Gy determination unit 33 in parallel with each other.

In the foregoing embodiment 1, the rollover determination system 20 having the safing function is realized by adding the safing determination unit 70 to the general rollover determination unit. Meanwhile, in the second embodiment, the rollover determination system 80 having the safing function is realized by providing two parallel lines of general determination units.

In the rollover determination system 80 of the embodiment, the AND circuit 84 generates the signal indicative of the vehicle rollover only when both the RR1-RA1 determination unit 32 and the RR2-RA2 determination unit 82 determine rollover of the vehicle. In this embodiment, therefore, the safing function has been already incorporated in both the determination units 32, 82.

Similarly, the AND circuit 85 generates the signal indicative of the vehicle rollover only when both the RR1-Gy determination unit 33 and the RR2-Gy determination unit 83 determine the vehicle rollover. This shows that the safing function has been already incorporated in the rollover determination system 80.

When a determination signal indicative of the vehicle rollover is generated by at least one of the AND circuits 84 and 85, a determination signal indicative of the vehicle rollover is sent from the OR circuit 86 to the occupant protection device 50.

In the rollover determination system 80 of the second embodiment, as described above, the RR1-RA1 determination unit 32 and the RR2-RA2 determination unit 82 for determining the vehicle rollover on the basis of the roll rate and the roll angle are arranged in parallel. The RR1-Gy determination unit 33 and the RR2-Gy determination unit 83 for determining the vehicle rollover on the basis of the lateral acceleration Gy and the roll rate are arranged in parallel. Therefore, the possibility of the vehicle rollover can be accurately determined on the basis of the roll rates RR1 and RR2 detected by the roll rate sensors 22, 24 in spite of unstable output of the lateral G sensor 26 and .the sensing delay.

In each of the rollover determination systems of the above-illustrated embodiments, the roll rate detected by the second roll rate sensor is used for the safing operation. This makes it possible to determine the rollover of the vehicle accurately with no delay.

Each of the rollover determination systems of the embodiments may be realized by simply modifying the configuration of the conventional system by adding a roll rate sensor used for determining the vehicle rollover as well as modifying processing executed in ECU.

In the aforementioned embodiment, one roll rate sensor is added as the second roll rate sensor. The number of the roll rate sensor is not limited to but two or more roll rate sensors may be added.

The second roll rate sensor may be provided in the place other than a floor tunnel of the vehicle.

While the invention has been described in detail with reference to preferred embodiments thereof, it is to be understood that the invention is not limited to the preferred embodiments or constructions. To the contrary, the invention is intended to cover various modifications and equivalent arrangements within the scope of the invention.

In the invention, the first roll rate sensor corresponds to the first roll rate sensor 22, and the second roll rate sensor corresponds to the second roll rate sensor 24. The lateral acceleration detection device corresponds to the lateral G sensor 26, and the rollover determination device corresponds to the main roll over determination device 30, the safing mechanism corresponds to the safing determination unit 70, and the safing determination unit corresponds to the RR2- RA2 determination unit 72, respectively.

According to the embodiment of the invention, the safing mechanism is added to the rollover determination device. The resultant rollover determination system is capable of detecting rollover of the vehicle accurately while suppressing the faulty error.

According to the embodiment, the rollover determination system can be realized through simple modification by adding a second roll rate sensor.

According to the embodiment, the safing determination unit determines rollover of the vehicle in the same manner as the rollover determination unit.

According to the embodiment of the invention, the first rollover determination unit for determining rollover of the vehicle on the basis of the roll rate and the second rollover determination unit for determining rollover of the vehicle on the basis of the lateral acceleration and the roll rate are provided in parallel with each other. Therefore the resultant rollover determination system incorporates the safing mechanism so as to accurately perform rollover determination.

The invention claimed is:

1. A rollover determination system comprising:
a first roll rate sensor that detects a first roll rate of a vehicle;
a second roll rate sensor that detects a second roll rate of the vehicle;
a lateral acceleration sensor that detects a lateral acceleration of the vehicle in a lateral direction of the vehicle; and
a controller that makes a first determination whether there is a possibility of rollover of the vehicle on the basis of at least one of the first roll rate detected by the first roll rate sensor and the second roll rate detected by the second roll rate sensor together with the lateral acceleration detected by the lateral acceleration sensor, wherein the first roll rate sensor and the second roll rate sensor are arranged to detect a rotational angular velocity about a longitudinal axis of the vehicle, and the controller makes, in parallel to the first determination, a second determination whether there is a possibility of rollover of the vehicle on the basis of one of the first roll rate and the second roll rate.

2. A rollover determination system according to claim 1, wherein the controller makes the first determination whether there is a possibility of rollover of the vehicle on the basis of the first roll rate the second roll rate, and the lateral acceleration.

3. A rollover determination system according to claim 2, wherein the second determination determines whether there is a possibility of rollover of the vehicle on the basis of the first roll rate and the second roll rate.

4. A rollover determination system according to claim 3, wherein the controller makes the first determination and the second determination whether there is a possibility of rollover of the vehicle in parallel in accordance with at least one map indicating a relationship between two parameters selected from the first roll rate, the second roll rate, a roll angle obtained by integrating the first roll rate with respect to time, a roll angle obtained by integrating the second roll rate with respect to time, and the lateral acceleration.

5. A rollover determination system according to claim 1, wherein the controller makes the first determination whether there is a possibility of rollover of the vehicle in accordance with at least one map indicating a relationship between two parameters selected from the first roll rate, the second roll rate, a roll angle obtained by integrating the first roll rate or the second roll rate with respect to time, and the lateral acceleration.

6. A rollover determination system according to claim 5, wherein the controller makes the first determination whether there is a possibility of rollover of the vehicle by determining whether the first roll rate or the second roll rate exceeds a predetermined threshold value within a predetermined time period.

7. A method of determining a rollover comprising the steps of:
detecting a first roll rate of a vehicle,
detecting a second roll rate of the vehicle;
detecting a lateral acceleration of the vehicle in a lateral direction of the vehicle, and
determining a first determination of whether there is a possibility of rollover of the vehicle on the basis of at least one of the first roll rate and the second roll rate together with the lateral acceleration, wherein the first and second roll rates are detected by measuring a rotational angular velocity about a longitudinal axis of the vehicle, in parallel to the first determination, determining a second determination whether there is a possibility of rollover of the vehicle on the basis of one of the first roll rate and the second roll rate.

8. A method of determining a rollover according to claim 7, wherein in the first determination it is determined whether there is a possibility of rollover of the vehicle on the basis of the first roll rate, the second roll rate, and the lateral acceleration.

9. A method of determining a rollover according to claim 8, wherein the second determination determines whether there is a possibility of rollover of the vehicle on the basis of the first roll rate and the second roll rate.

10. A method of determining a rollover according to claim 9, wherein the first determination and the second determination whether there is a possibility of rollover of the vehicle are made in parallel in accordance with at least one map indicating a relationship between two parameters selected from the first roll rate, the second roll rate, a roll angle obtained by integrating the first roll rate with respect to time, a roll angle obtained by integrating the second roll rate with respect to time, and the lateral acceleration.

11. A method of determining a rollover according to claim 7, wherein the first determination whether there is a possibility of rollover of the vehicle is made in accordance with at least one map indicating a relationship between two parameters selected from the first roll rate, the second roll rate, a roll angle obtained by integrating the first roll rate with respect to time, a roll angle obtained by integrating the second roll rate with respect to time, and the lateral acceleration.

12. A method of determining a rollover according to claim 11, wherein the first determination whether there is a possibility of rollover of the vehicle is made by determining whether the first roll rate or the second roll rate exceeds a predetermined threshold value within a predetermined time period measured from detection of the roll rate.

* * * * *

UNITED STATES PATENT AND TRADEMARK OFFICE
CERTIFICATE OF CORRECTION

PATENT NO. : 7,213,670 B2  Page 1 of 1
APPLICATION NO. : 10/483967
DATED : May 8, 2007
INVENTOR(S) : Motomi Iyoda et al.

It is certified that error appears in the above-identified patent and that said Letters Patent is hereby corrected as shown below:

| Column | Line | |
|---|---|---|
| 2 | 12 | After "made" delete "20". |
| 3 | 54 | After "rollover" delete "30". |

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,213,670 B2  Page 1 of 1
APPLICATION NO. : 10/483967
DATED : May 8, 2007
INVENTOR(S) : Motomi Iyoda et al.

It is certified that error appears in the above-identified patent and that said Letters Patent is hereby corrected as shown below:

| Column | Line | |
|---|---|---|
| 2 | 12 | After "made" delete "20". |
| 3 | 54 | After "rollover" delete "30". |

Signed and Sealed this

Eighth Day of April, 2008

JON W. DUDAS
*Director of the United States Patent and Trademark Office*